Dec. 7, 1954  T. H. LARSON ET AL  2,696,355
AIRFOIL CONTROL APPARATUS RESPONSIVE TO AIRCRAFT SPEED
Filed June 20, 1950  2 Sheets-Sheet 1
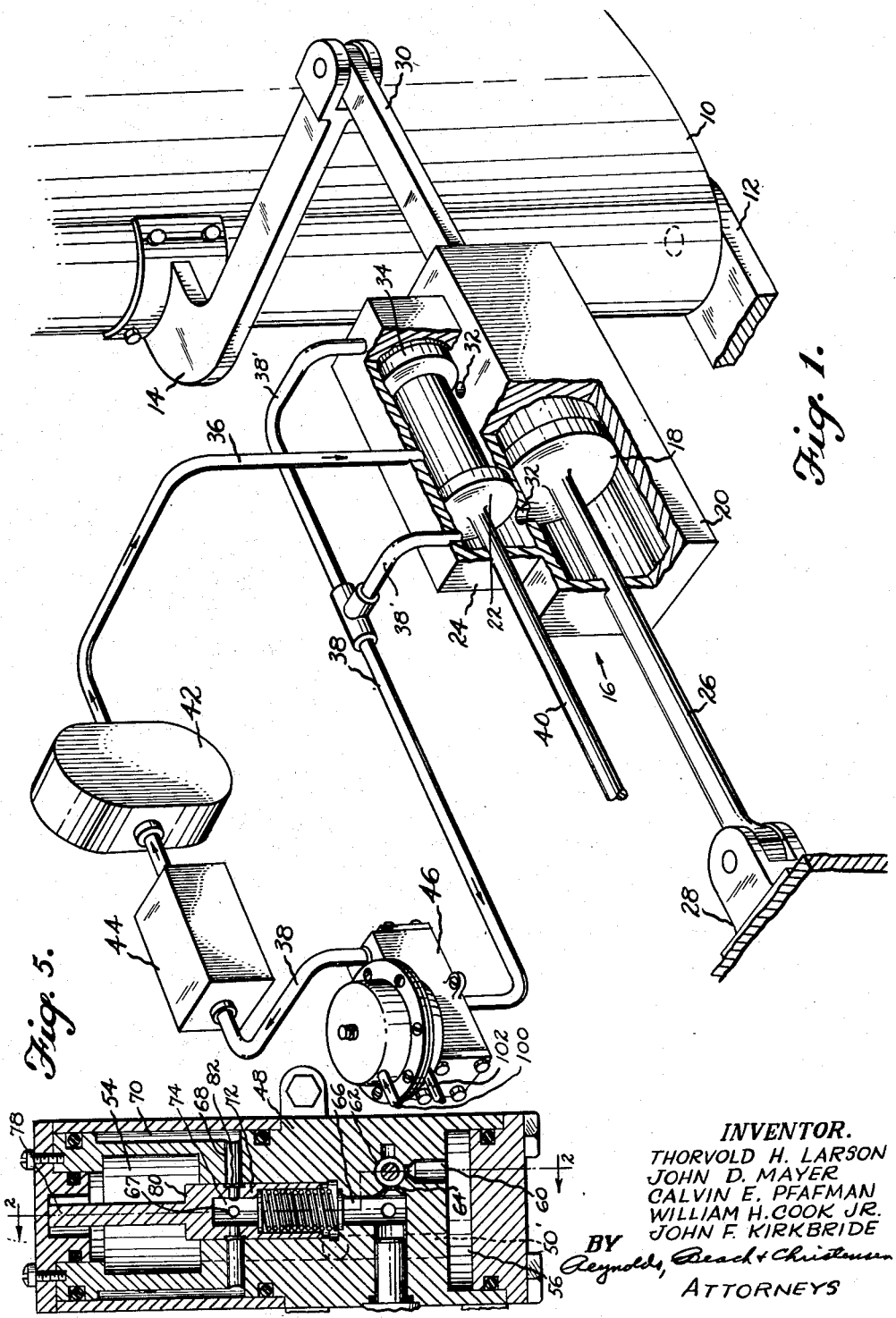
INVENTOR.
THORVOLD H. LARSON
JOHN D. MAYER
CALVIN E. PFAFMAN
WILLIAM H. COOK JR.
JOHN F. KIRKBRIDE
BY Reynolds, Beach & Christensen
ATTORNEYS Dec. 7, 1954 T. H. LARSON ET AL 2,696,355
AIRFOIL CONTROL APPARATUS RESPONSIVE TO AIRCRAFT SPEED
Filed June 20, 1950 2 Sheets-Sheet 2
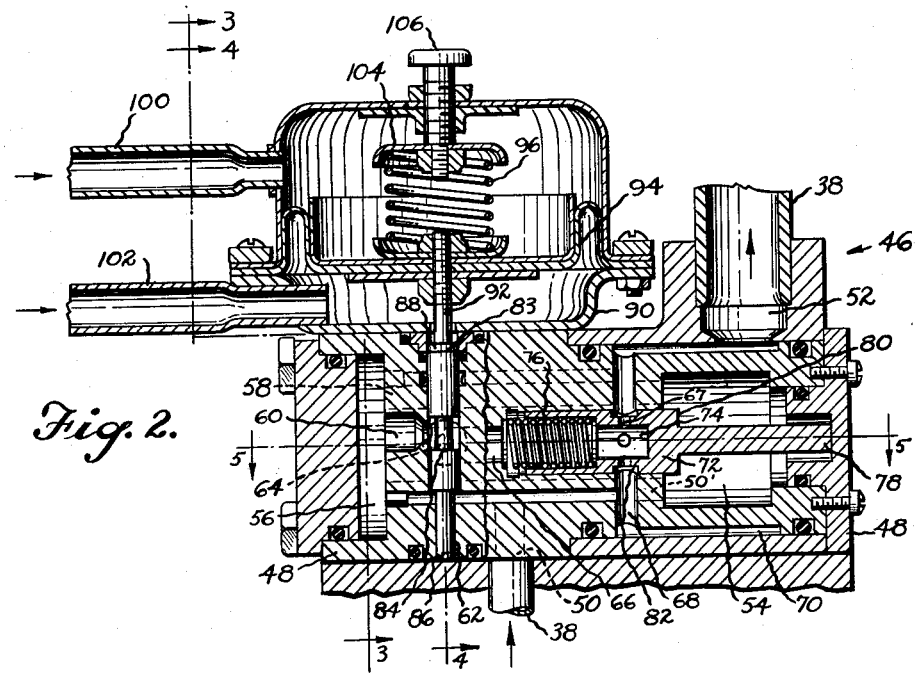
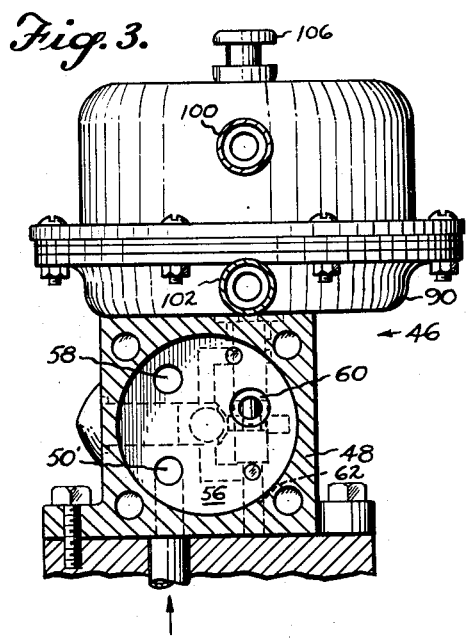
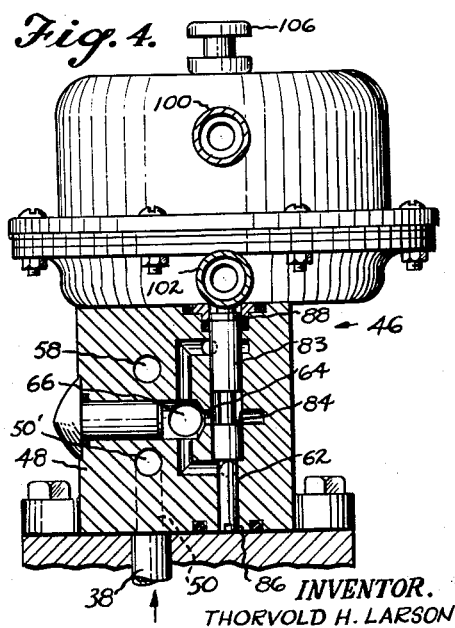
INVENTOR.
THORVOLD H. LARSON
JOHN D. MAYER
CALVIN E. PFAFMAN
WILLIAM H. COOK JR.
JOHN F. KIRKBRIDE
BY
Reynolds, Beach & Christensen
ATTORNEYS 2,696,355

Patented Dec. 7, 1954

2,696,355

AIRFOIL CONTROL APPARATUS RESPONSIVE TO AIRCRAFT SPEED

Thorvold H. Larson, John D. Mayer, Calvin Edwin Pfaffman, William H. Cook, Jr., and John F. Kirkbride, Seattle, Wash., assignors to Boeing Airplane Company, Seattle, Wash., a corporation of Delaware Application June 20, 1950, Serial No. 169,256

6 Claims. (Cl. 244—78)

This invention relates to operating mechanism for control airfoils, and more particularly to control apparatus sensitive to aircraft speed to vary the rate of airfoil control movement effected by boost mechanism as a function of such speed. As herein illustratively described, the control apparatus is applied to the rudder of an airplane; however, it will be readily obvious that the elevators or ailerons can be controlled in like manner.

The problem to which the invention is directed had not been particularly acute in slow-speed aircraft. It arises primarily as a result of the danger of shock overload on the airfoil and its supporting structure, created by the abrupt heavy impact of air on the airfoil during sudden large deflections thereof away from neutral position at very high airplane speeds. A general purpose of the invention is to avoid this danger without complicating or adding unduly to the mass of the airfoil structure or the airfoil supporting structure.

In jet driven or other highspeed airplanes, the rudder, for instance, is usually operated through a hydraulic actuator or boost mechanism. A control valve in the boost mechanism is shifted by the pilot to establish and to vary rudder position. However, the rate of movement of the rudder between positions is determined by the rate of flow of the liquid to and from the boost cylinder, where a hydraulic jack type of boost is used. Usually this rate of flow is governed or regulated at a value independent of fluid pressure, so that, according to the past practice, the airfoil jack would be moved at a constant rate whatever the aircraft speed or control surface angle of incidence.

In accordance with the present invention, the rate of flow of liquid to and from the boost cylinder is further controlled as a function of airplane speed, the rate being automatically reduced as speed increases. Thus at maximum airplane speed the rudder is deflected comparatively slowly, at a rate below that which would tend to shock-overload the empennage structure, while at slower speeds its rate of movement is made greater, as it should be for adequate rudder control effectiveness. Preferably the automatic liquid controller sensitive to airplane speed becomes effective only above some selected intermediate speed below which the empennage structure is fully capable of withstanding all loads caused by rudder deflection at a normally rapid rate.

In addition to the novel combination control apparatus comprising the hydraulic boost, the liquid supply means feeding the boost cylinder, and the flow control mechanism including the speed-sensitive variable flow-restricting apparatus in the boost cylinder supply circuit, further features of the invention reside in the subcombination of the particular flow control apparatus as such. Such apparatus preferably comprises the combination of a liquid pressure sensitive flow regulating valve and an aircraft speed sensitive flow controlling valve, coordinated in a compact unit which can be installed at minimum expense and with very slight increase in the space and weight requirements of the control system.

These and other features, objects and advantages of the invention will become further evident from the following description thereof based upon the accompanying drawings.

Figure 1 is a perspective view of a rudder control system showing the principal elements thereof in simplified form.

Figure 2 is a longitudinal sectional view of the dual control valve unit.

Figure 3 is a transverse sectional view taken on line 3—3 in Figure 2.

Figure 4 is a transverse sectional view taken on line 4—4 in Figure 2.

Figure 5 is a transverse sectional view taken on line 5—5 in Figure 2.

In Figure 1, the rudder 10 pivots on a support 12 and is swung by a rudder control arm 14 actuated by the hydraulic boost mechanism 16. The boost mechanism is conventional and consists of a piston 18, a complemental cylinder 20, a boost control slide valve 22 and a complemental valve housing 24 mounted directly on the boost cylinder 20 and having a common wall therewith. The boost piston 18 is connected to a piston rod 26 which pivots on a fixed support 28 for swinging of the piston rod about an axis parallel to the rudder axis. The boost cylinder in turn is pivotally connected to the arm 14 by a rod 30.

In the rudder-neutral position, the piston 18 is centered in the boost cylinder 20. Ports 32 are formed in the common wall between the valve housing 24 and boost cylinder 20 at locations spaced lengthwise of the cylinder to admit liquid under pressure from the valve housing into the end spaces of the boost cylinder beyond the extreme positions of the piston therein. The valve 22 has two lands 34 normally registering with the respective ports 32. Liquid enters the valve housing from a supply conduit 36 through a port located substantially midway between the ends of the valve housing. Liquid leaves the valve housing through one of alternative outlet ports located at positions spaced lengthwise of the housing, corresponding to the respective ports 32, and flows through branch return conduits 38' to a main return conduit 38 complemental to the supply conduit 36. The valve 22 is positioned in its housing by a control rod 40 extending therefrom to a suitable control location.

The hydraulic system further comprises the pump 42, the reservoir 44 and the flow-control valve unit 46 connected in series in the hydraulic circuit. In general, steady hydraulic pressure is maintained in the supply conduit 36 by pump 42. Should the control rod 40 be moved to the left in Figure 1, the ports 32 are uncovered by the valve lands 34 in such manner that the left end of hydraulic cylinder 20 receives liquid under pressure from supply main 36 whereas the right end of the cylinder 20 discharges into its associated return-main branch 38'. Under these conditions the boost cylinder 20 advances to the left of the figure and the rudder control arm 14 is swung forward and the rudder 10 is swung to port accordingly. This movement progesses until the boost cylinder 20 and valve housing 24 have advanced to the point relative to the valve 22 at which the valve lands 34 again cover the ports 32.

Hydraulic boost devices operating in the foregoing manner are conventional. However, the rate of movement of the boost cylinder in a conventional airfoil control system is regulated at a substantially constant value under all conditions of operation. In accordance with the present invention flow of liquid in these lines is further controlled or variably restricted in accordance with speed of the aircraft. This composite flow control operation is effected by the unit 46 about to be described by reference to the remaining drawing figures, comprising both a pressure sensitive flow regulating valve and a speed sensitive flow controlling valve connected effectively in series in the hydraulic supply circuit. While the drawing shows this unit connected in the return side of the hydraulic circuit, it will be obvious that the control valve unit 46 could be located in the supply side with equal effectiveness.

As indicated in Figure 2, liquid enters the valve unit housing or block 48 through an inlet 50 in the bottom of the housing and leaves the housing through an outlet 52 in its top. The inlet passage branches inside the housing to a pressure chamber 54 at one end of the housing (Figure 2) and a smaller header chamber 56 at its opposite end. For reasons subsequently explained, it is desirable that the liquid pressure in the chamber 54 be equal to that in the chamber 56. To this end direct and unrestricted communication between the chambers is afforded through an equalizing passage 58, as well as through the passage 50' representing the oppositely extending branches of inlet 50. The pressure chamber 54 merely pockets or accumulates liquid at representative system pressure and is not located directly in the normal path of flow through the valve housing 48. On the other hand, the header chamber 56 forms a section of the flow path through the housing, liquid flowing from this chamber, in sequence, through longitudinal bore 60 offset from the axis of the block, through an intersecting vertical bore 62, through transverse connecting bore 64, into a stepped-diameter longitudinal bore 66 on the housing axis as defined by the cylindrical chambers 54 and 56, and from this latter bore outward through ports 67 in the valve body 72 and through radial passages 68 in the block 48 into an annular collector duct 70 communicating with the outlet 52.

The passage bore 66 slidably receives the hollow flow regulating valve 72. The ports 67 in such valve are arranged to permit passage of liquid from the hollow interior 74 of the valve outward into the radial bores 68 when in longitudinal registry therewith. There is an annular groove 82 in the valve body exterior at the location of the valve ports 67 so that circumferential registry of the ports with the bores 68 is unnecessary in order for the liquid to pass into such bores. A spring 76 reacts from a shoulder in the bore 66 against a seat on the valve 72, urging the latter toward a position of full registry of its groove 82 with the radial bores 68. Movement of the valve by the spring is limited by a stop stem 78 projecting axially from the valve through the pressure cavity 54 for engagement with the end wall of the housing 48 as shown in Figure 2. The end 80 of the valve body carrying stem 78 is exposed to the pressure of the liquid in the pressure chamber 54, so that the valve body acts as a piston opposed by the spring 76 and the pressure of liquid in the valve guide chamber 66 and valve cavity 74. The pressure of the liquid in chamber 54 acting on the body tends to move its annular groove 82 out of the position of registry with the radial bores 68. Ignoring the effect of valve 83, passage of liquid to these bores is thus throttled to a greater or lesser extent as the pressure of the liquid in the supply section of the boost device outflow pipe 38 connected to block 48 increases or decreases, to maintain a constant quantity outflow from the section of pipe 38 discharging from block 48.

Liquid enters the bore 66 of valve 72 from the housing inlet 50 and flows out through the ports 67 and ducts 68 to the outlet 52. If the pressure of the liquid in the pressure chamber 54 is normal, that is, equals the desired value for which the spring 76 is selected, supplementing the pressure of liquid in bore 66 with the valve 83 fully open, the valve 72 will occupy an intermediate longitudinal position in its bore. In this position the right shoulder of valve groove 82 partly restricts bores 68 to throttle the flow of liquid through the housing. In this position of the valve, stop 78 will be out of contact with the end wall of the housing, whereas in Figure 2 it is shown in contact therewith representing the position of low or zero pressure in chamber 54. If the liquid pressure in the inflow section of pipe 38 increases above the normal value there is an immediate tendency for the flow of liquid through the housing and thereby in the entire circuit, to increase. However, there is also an immediate repositioning of the valve 72 as a result of the greater increase in liquid pressure acting on its stem end over the increase in liquid pressure acting in bore 66 on its other end, because of the pressure reducing action of the restricted port 64 through which the liquid flows to this latter end. Such valve movement further restricts the passage of fluid through the bores 68 by moving the valve groove 82 further out of full registry with such bores. A reverse action takes place if the hydraulic pressure in chamber 54 decreases. The effect of valve 72 is therefore to regulate flow of liquid at a rate substantially independent of liquid pressure variations in the airflow section of pipe 38, so the result will be a constant volume flow through the boost cylinder 20 as long as valve 22 is shifted to a control surface actuating position and valve 83 remains fully open.

Disregarding valve 83, the flow control operation described thus far is conventional. The operation of valve 83, however, modifies such operation. This valve is received in the housing bore 62 and is operable under certain conditions to restrict further the flow of hydraulic fluid through port 64 from the inlet section of pipe 38 to bore 66. The upper end of land 84 on this valve in open position of the valve lies at the lower edge of the entrance to port 64. This position represents the lowermost position of the valve 83 as determined by contact between the valve end 86 and the housing covering the valve guide bore.

By raising the valve 83 the land 84 progressively increases the restriction of the entrance to port 64 and thereby throttles flow of liquid through the housing, producing a greater reduction in pressure through this port, and causing the pressure in chamber 54 to move valve 72 farther to the left to reduce the discharge of liquid from the outflow section of pipe 38. Upward movement of this valve 83 is limited by contact between a spacer washer 88 which rests on a shoulder at the upper end of the valve body, and an abutment at the top wall of the valve housing. Such an abutment in the illustrated case is formed by the edge of an aperture in the bottom wall of a casing 90 mounted on the top of the valve housing and defining an air chamber within it. A stem extension 92 of the valve 83 projects through this aperture in the bottom wall of casing 90 for operative connection to a diaphragm 94 dividing the air chamber within the casing into separate end spaces, above and below the diaphragm.

A spring 96 received within the upper air space of casing 90 reacts downwardly from the casing against the diaphragm 94 and the stem 92 of the valve 83, urging the valve toward its open position in which the entrance to port 64 is fully uncovered. However, a pressure differential is created between the opposite end spaces of the air chamber in casing 90 in accordance with speed of the aircraft opposing the force of the spring 96. When this differential becomes sufficiently great it will shift the diaphragm against the force of the spring and move the valve 83 upwardly until the increased force produced by the partially compressed spring balances the differential. The valve thus moving restricts the flow through the bore 64.

As aircraft speed progressively increases such pressure differential between the end spaces of casing 90 also increases proportionately. This action is obtained by connecting a pitot-static tube combination (not shown) to the upper and lower end spaces of the casing 90 by conduits 100 and 102, respectively. As shown, the space below the diaphragm 94 receives the ram pressure of the pitot-static tube while the space above the diaphragm receives the static pressure thereof. The differential between these pressures increases with aircraft speed in well known manner.

Preferably the speed sensitive element in the form of diaphragm 94 mounted in the casing 90 responds by movement to aircraft speed variations only for speeds above a predetermined value selected or established by initial loading of the spring 96. To restrict movement of the diaphragm in this way the upper end of the spring reacts against a cup 104 which may be raised and lowered adjustably by a thumb screw 106 threaded in the upper wall of the casing 90. If, for instance, it is desired to have the valve 83 remain steadily open until aircraft speed increases above, let us say, 400 miles per hour, then the thumb screw will be adjusted until the spring 96 is compressed by an amount which corresponds to the opposing diaphragm force created by the pressure differential in the ends of the casing 90 at the particular speed of 400 miles per hour. The selection of the speed value will ordinarily be that beyond which very sudden control movement of the rudder is undesirable because of the shock loads which such movement would impose on the empennage structure.

To avoid this unduly abrupt movement of the control surface the air pressure differential moves the diaphragm upward against spring 96 progressively with increasing speed of the airplane above the selected value to close the valve 83–64 and restrict flow of liquid through the circuit. This correspondingly reduces the rate of flow of liquid into boost cylinder 20 and consequently the speed at which it swings the rudder. At the highest aircraft speed for which the boost mechanism control apparatus is designed to operate the rudder is moved by the boost mechanism at the slowest rate, whereas at speeds below the selected aircraft speed at which the speed-sensitive control valve 83 is designed to operate, the rate of movement of the rudder effected by the boost mechanism is regulated at a value established independently of airplane speed. Preferably the speed-sensitive mechanism can never cause valve 83 to throttle port 64 more than half. It will be understood, of course, that valve 72 functions in its intended capacity, namely, to remove effects of liquid pressure variations on the rate of flow of liquid through the boost mechanism 16 irrespective of valve 83.

If for any reason the pitot-static tube apparatus is damaged the valve 83 is always returned to its fully open position by spring 96 so that the airplane is not without hydraulic control of the rudder. Because of the simplicity of the apparatus, there are very few sources of difficulty which could impair its effectiveness to produce the type of control operation desired under all operating conditions. If desired, the diaphragm 94 may be designed, as by means of a bi-metal construction, to compensate for effects of temperature on tension in spring 96 although this will not be necessary in the usual case because the adjusted initial loading of this spring corresponding to the speed above which the valve 83 becomes operative is ordinarily not particularly critical.

We claim as our invention:

1. In aircraft, control mechanism for an airfoil movable relative to such aircraft and actuated by hydraulic means, comprising a valve housing having an inlet and an outlet for liquid, a passage between said inlet and outlet, a first valve chamber and actuatable complemental valve element movably mounted therein, intersecting said passage to restrict flow therethrough in accordance with the setting of said first valve element, a second valve chamber and complemental valve element movably mounted therein, intersecting said passage to restrict flow therethrough in accordance with the setting of said second valve element, spring means urging said second valve element normally toward open position, a pressure chamber communicating with the inlet and formed in said housing for holding liquid at a pressure substantially equal to that in said passage, a piston connected to said second valve element and arranged in said housing for moving said second valve element in opposition to said spring means responsively to pressure increases of liquid in said pressure chamber, thereby to regulate flow of liquid through said passage at a rate substantially independent of liquid pressure variations, a casing adjacent to said valve housing and defining an air chamber, a valve actuating member projecting through said housing into said air chamber and connected to said first valve element to control positioning thereof, pressure actuated diaphragm means operatively connected to said valve actuating member and dividing said air chamber into separate air spaces wherein differential air pressures actuate said diaphragm for movement of said valve actuating member, and spring means acting on said valve actuating member to urge said first valve element normally into open position, having openings leading into the respective air spaces therein to produce in such air spaces a pressure differential which tends to urge the first valve element toward closed position in opposition to said spring means.

2. Shock overload protective control mechanism for a high-speed aircraft airfoil movable relative to such aircraft comprising hydraulic actuating means operatively connected to the airfoil for effecting movement thereof through any selected operating displacement at a rate in accordance with rate of flow of liquid operating said actuating means, liquid supply means connected to said hydraulic actuating means, a flow restricting valve operatively connected in said liquid supply means and operable to control rate of flow of such liquid to said actuating means, and valve control means including means responsive to speed of the aircraft and means operatively connecting said speed-responsive means to said valve for progressively restricting the flow to the actuating means in response to increasing aircraft speed and for progressively opening said valve to increase flow in response to decreasing aircraft speed, substantially independently of the magnitude of said operating displacement, thereby to limit within a safe value the rate of airfoil movement attainable at high speeds of the aircraft, and flow regulating valve means operatively connected in the supply means effectively in series with the flow restricting valve, said flow regulating valve means including a pressure-actuated flow regulating control element operable to increase the valve opening in response to fluid pressure decreases and to decrease the valve opening in response to fluid pressure increases, thereby to substantially remove the effect of fluid pressure variations on rate of flow of fluid to the hydraulic actuating means.

3. The mechanism defined in claim 2, wherein the control means comprises pre-loaded spring means opposing valve-closing movements of the speed responsive means and progressively yieldable in response to increases in the force of such speed responsive means only above a predetermined minimum force.

4. The mechanism defined in claim 2, wherein the speed responsive means comprises a pressure chamber, diaphragm means operatively connected to the valve and dividing said chamber into separate air spaces, said diaphragm means being movable in response to differential pressures in the respective spaces, pitot-static tube pressure connections extending respectively to the chamber air spaces to influence the diaphragm means in accordance with the pitot-static tube pressures, and further wherein the control means comprises a spring acting in opposition to valve closing movement of the diaphragm means and being preloaded to prevent such movement thereof at pitot-static tube pressures corresponding to airspeeds below a selected value.

5. In combination with an airfoil in a high speed aircraft, manual pilot airfoil deflection control means displaceable by the pilot at will to vary airfoil displacement in flying the aircraft, power means operated by said control means and producing mechanically powered displacement of said airfoil of a magnitude determined by the displacement setting of said control means, air speed responsive means, and regulating means independent of said control means controlled by said air speed responsive means and in turn regulating the rate of displacement of said power means in substantially inverse proportion to instantaneous air speed and independently of airfoil displacement and control means displacement.

6. The combination defined in claim 5, wherein the regulating means includes means rendering the same automatically inoperative to regulate airfoil displacement rate at air speeds below a predetermined speed.

References Cited in the file of this patent

UNITED STATES PATENTS

| Number | Name | Date |
|---|---|---|
| 2,188,834 | Fischel | Jan. 30, 1940 |
| 2,191,250 | Fischel | Feb. 20, 1940 |
| 2,208,656 | Zand | July 23, 1940 |